US009767788B2

(12) United States Patent
Li

(10) Patent No.: US 9,767,788 B2
(45) Date of Patent: Sep. 19, 2017

(54) METHOD AND APPARATUS FOR SPEECH SYNTHESIS BASED ON LARGE CORPUS

(71) Applicant: Baidu Online Network Technology (Beijing) Co., Ltd, Beijing (CN)

(72) Inventor: Xiulin Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 14/588,069

(22) Filed: Dec. 31, 2014

(65) Prior Publication Data

US 2015/0371626 A1 Dec. 24, 2015

(30) Foreign Application Priority Data

Jun. 19, 2014 (CN) .......................... 2014 1 0276352

(51) Int. Cl.
*G06F 17/21* (2006.01)
*G10L 13/00* (2006.01)
*G10L 13/08* (2013.01)
*G10L 13/10* (2013.01)

(52) U.S. Cl.
CPC .............. *G10L 13/00* (2013.01); *G10L 13/08* (2013.01); *G10L 13/10* (2013.01)

(58) Field of Classification Search
CPC ....................................................... G06F 17/21
USPC ............................................................ 704/10
See application file for complete search history.

(56) References Cited

U.S. PATENT DOCUMENTS

2007/0129938 A1* 6/2007 Wang .................. G06F 17/2818 704/10
2007/0239439 A1 10/2007 Yi et al.
2008/0015860 A1* 1/2008 Lane ..................... G10L 13/047 704/258
2008/0147405 A1 6/2008 Qing et al.
2009/0048843 A1* 2/2009 Nitisaroj ............. G10L 15/1807 704/260

(Continued)

OTHER PUBLICATIONS

Extended European Search Report, EP Application No. 14200490.2, dated Oct. 30, 2015.

(Continued)

*Primary Examiner* — David Hudspeth
*Assistant Examiner* — Shreyans Patel
(74) *Attorney, Agent, or Firm* — Orrick, Herrington & Sutcliffe, LLP

(57) ABSTRACT

The present invention discloses a method and apparatus for speech synthesis based on a large corpus. The method for speech synthesis based on a large corpus comprises: utilizing a prosodic structure prediction model to carry out prosodic structure prediction processing on input text to provide at least one alternative prosodic boundary partitioning solution; determining a prosodic boundary partitioning solution according to structure probability information about a prosodic unit in a speech corpus in the at least one alternative prosodic boundary partitioning solution; and carrying out speech synthesis according to the determined prosodic boundary partitioning solution. The method and apparatus for speech synthesis based on a large corpus provided by the embodiments of the present invention improve the naturalness and flexibility of speech synthesis.

20 Claims, 8 Drawing Sheets

(56) References Cited

U.S. PATENT DOCUMENTS

2014/0222421 A1 8/2014 Chen et al.

OTHER PUBLICATIONS

Sanders, E., et al., "Using Statistical Models to Predict Phrase Boundaries for Speech Synthesis," 4th *Euro. Conf. on Speech Comm. and Tech.*, [Eurospeech] (XP000855056) (Sep. 18, 1995) pp. 1811-1814, vol. 3, Madrid, Spain.

Taylor, P., et al., "Assigning phrase breaks from part-of-speech sequences," *Computer Speech and Language*, (XP004418765) (1998) pp. 99-117, vol. 12, No. 2, Elsevier, London, GB.

Wang, M Q., et al., "Automatic Classification of intonational phrase boundaries," *Computer Speech & Language*, (XP000266328) (Apr. 1, 1992) pp. 175-196, vol. 6, No. 2, Elsevier, London, GB.

Communication pursuant to Article 94(3) EPC, EP Application No. 14200490.2, dated Dec. 6, 2016.

Communication pursuant to Article 94(3) EPC, EP Application No. 14200490.2, dated Jun. 30, 2016.

Shao, et al., "Prosodic Word Boundaries Prediction for Mandarin Text-to-Speech," International Symposium on Tonal Aspects of Languages: With Emphasis on Tone Languages, TAL-2004, pp. 159-162 (Mar. 28-31, 2004) Beijing, China.

Communication pursuant to Article 94(3) EPC, EP Application No. 14200490.2, dated Jun. 13, 2017.

* cited by examiner

| 501 | 502 |
|---|---|
| 人类 | B1 |
| 文明 | B0 |
| 的 | B1 |
| 发展 | B0 |
| ， | B2 |
| 即将 | B1 |
| 进入 | B1 |
| 一个 | B1 |
| 新 | B0 |
| 世纪 | B0 |
| 。 | B2 |

FIG.5

METHOD AND APPARATUS FOR SPEECH SYNTHESIS BASED ON LARGE CORPUS

CROSS-REFERENCE TO RELATED APPLICATIONS

The present application claims priority to Chinese Patent Application No. CN201410276352.X, filed on Jun. 19, 2014, the entire disclosure of which is incorporated herein by reference in its entirety and for all purposes.

TECHNICAL FIELD

The embodiments of the present invention relate to the technical field of text-to-speech conversion, and in particular to a method and device for speech synthesis based on a large corpus.

BACKGROUND

Speech is the most customary and most natural means for human-machine communications. The technology for converting a text input into a speech output is called text-to-speech (TTS) conversion or speech synthesis technology. It relates to a plurality of fields such as acoustics, linguistics, digital signal processing multimedia technology and is a cutting-edge technology in the field of Chinese information processing.

FIG. 1 illustrates a signal flow of a speech synthesis system provided by the prior art. With reference to FIG. 1, in a training phase, a prosodic structure prediction model 103, an acoustics model 104 and a candidate unit 105 may be obtained based on the training of annotated data in a text corpus 101 and a speech corpus 102. The prosodic structure prediction model 103 provides a reference for prosodic structure prediction 107 in a speech synthesis phase; the acoustics model 104 provides a basis for speech synthesis 109; and the candidate unit 105 is a software unit for retrieving common candidate waveforms in the speech synthesis 109 of waveform concatenation type.

In the speech synthesis phase, firstly, text analysis 106 is performed on input text; then prosodic structure prediction 107 is performed on the input text according to the prosodic structure prediction model 103; and then parameter prediction/unit selection 108 is performed according to various speech synthesis patterns, that is, speech synthesis parameter synthesis type or speech synthesis of waveform concatenation type; and finally, the final speech synthesis 109 is performed.

By adopting the existing speech synthesis system to perform prosodic structure prediction, regarding some input text, a prosodic hierarchy structure determined by the input text may already be obtained. However, the prosodic hierarchy structure of speech is often affected by a variety of factors in people's actual communications. FIG. 2 is a schematic diagram illustrating the principle of influencing factors of a prosodic structure in real person speech. With reference to FIG. 2, the prosodic structure of the real person speech may be affected by the characteristics, emotions, basic frequency and the meaning of sentences of a speaker. Take the characteristics of the speaker as an example, the prosodic structure of speaking of a man aged 70 is different from the prosodic structure of speaking of a woman aged 30.

Therefore, the prosodic structure of a sentence obtained via prediction according to a uniform prosodic structure prediction model 103 has a poor flexibility, thus resulting in a poor naturalness of speech finally synthesized by the speech synthesis system.

SUMMARY

For this purpose, the embodiments of the present invention propose a method and apparatus for speech synthesis based on a large corpus so as to improve the naturalness and flexibility of synthesized speech.

In a first aspect, the embodiments of the present invention propose a method for speech synthesis based on a large corpus, the method comprising:

utilizing a prosodic structure prediction model to carry out prosodic structure prediction processing on input text to provide at least two alternative prosodic boundary partitioning solutions;

determining a prosodic boundary partitioning solution according to structure probability information about a prosodic unit in a speech corpus in the at least two alternative prosodic boundary partitioning solutions; and carrying out speech synthesis according to the determined prosodic boundary partitioning solution.

In a second aspect, the embodiments of the present invention propose an apparatus for speech synthesis based on a large corpus, the apparatus comprising:

a prediction processing module for utilizing a prosodic structure prediction model to carry out prosodic structure prediction processing on input text to provide at least two alternative prosodic boundary partitioning solutions;

a boundary partitioning module for determining a prosodic boundary partitioning solution according to structure probability information about a prosodic unit in a speech corpus in the at least two alternative prosodic boundary partitioning solutions; and a speech synthesis module for carrying out speech synthesis according to the determined prosodic boundary partitioning solution.

By means of utilizing a prosodic structure prediction model to carry out prosodic structure prediction processing on input text to provide at least two alternative prosodic boundary partitioning solutions, then determining a prosodic boundary partitioning solution according to structure probability information about a prosodic unit in a speech corpus in the at least two alternative prosodic boundary partitioning solutions, and finally carrying out speech synthesis according to the determined prosodic boundary partitioning solution, the method and apparatus for speech synthesis based on a large corpus proposed in the embodiments of the present invention improve the naturalness and flexibility of synthesized speech.

BRIEF DESCRIPTION OF THE ACCOMPANYING DRAWINGS

By means of reading the detailed description hereinafter of the non-limiting embodiments made with reference to the accompanying drawings, the other features, objectives, and advantages of the present invention will become more apparent:

FIG. 5 is a schematic diagram of prosodic annotated data in a text corpus provided by the first embodiment of the present invention;

DETAILED DESCRIPTION OF THE PREFERRED EMBODIMENTS

The present invention will be further described in detail below in conjunction with the accompanying drawings and the embodiments. It can be understood that specific embodiments described herein are merely used for explaining the present invention, rather than limiting the present invention. Additionally, it also needs to be noted that, for ease of description, the accompanying drawings only show parts related to the present invention rather than all the contents.

FIGS. 3-6 illustrate a first embodiment of the present invention.

Figure 1:
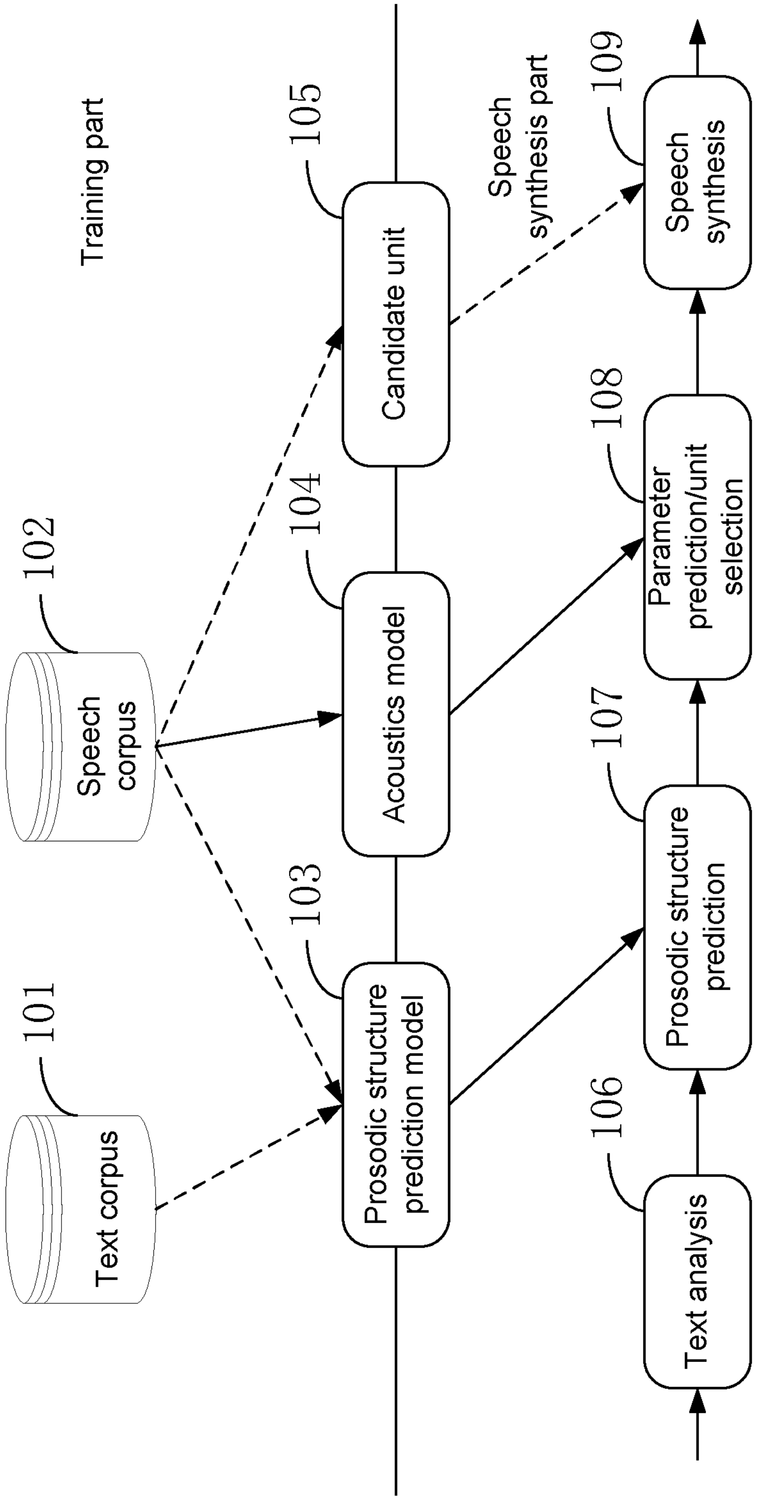
FIG. 1 is a diagram illustrating a signal flow of a speech synthesis system provided by the prior art.
Figure 2:
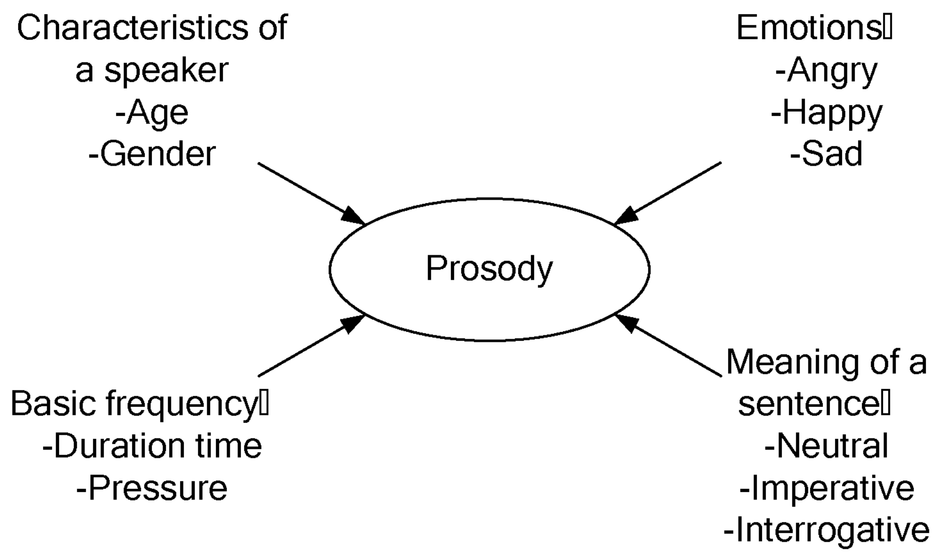
FIG. 2 is a schematic diagram illustrating the principle of influencing factors of a prosodic structure in real person speech in the prior art.
Figure 3:
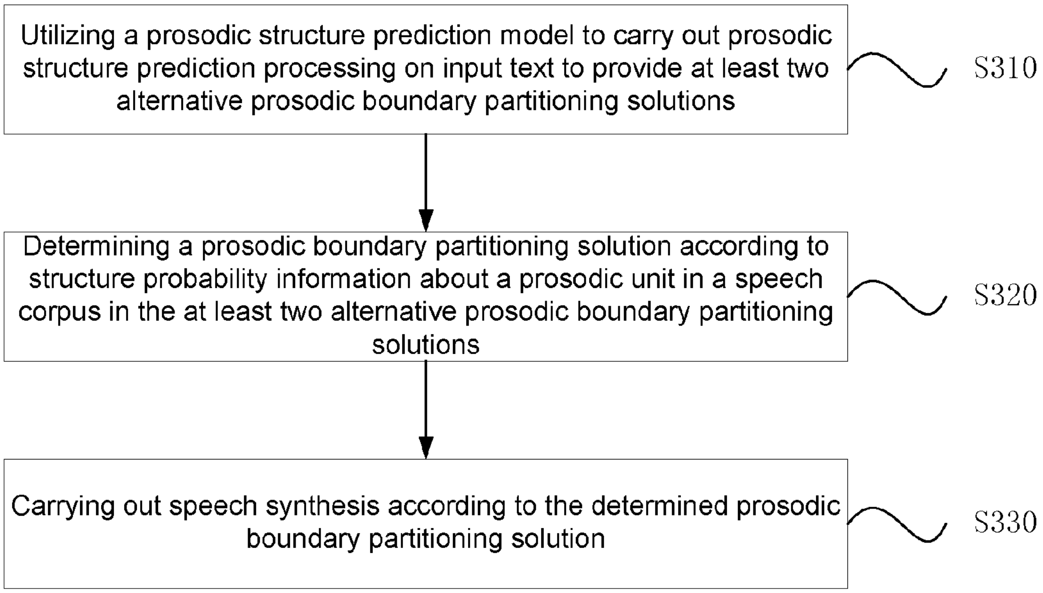
FIG. 3 is a flowchart of a method for speech synthesis based on a large corpus provided by a first embodiment of the present invention.

FIG. 3 is a flowchart of a method for speech synthesis based on a large corpus provided by the first embodiment of the present invention. The method for speech synthesis based on a large corpus operates on a calculation apparatus specialized for speech synthesis. The calculation apparatus specialized for speech synthesis comprises a general purpose computer such as a personal computer and a server, and further comprises various embedded computers for speech synthesis. The method for speech synthesis based on a large corpus comprises:

S310, a prosodic structure prediction model is utilized to carry out prosodic structure prediction processing on input text to provide at least two alternative prosodic boundary partitioning solutions.

A speech synthesis system may be divided into three main modules of text analysis, prosodic processing and acoustics processing in terms of composition and function. The text analysis module mainly simulates a person's natural language understanding process, so that the computer can totally understand the input text and provide various pronunciation prompts required by the latter two parts. The prosodic processing plans out segmental features for synthesized speech, so that the synthesized speech can correctly express semanteme and sound more natural. The acoustics processing outputs the speech, namely, the synthesized speech, according to the requirements of processing results of the previous two parts.

Figure 4:
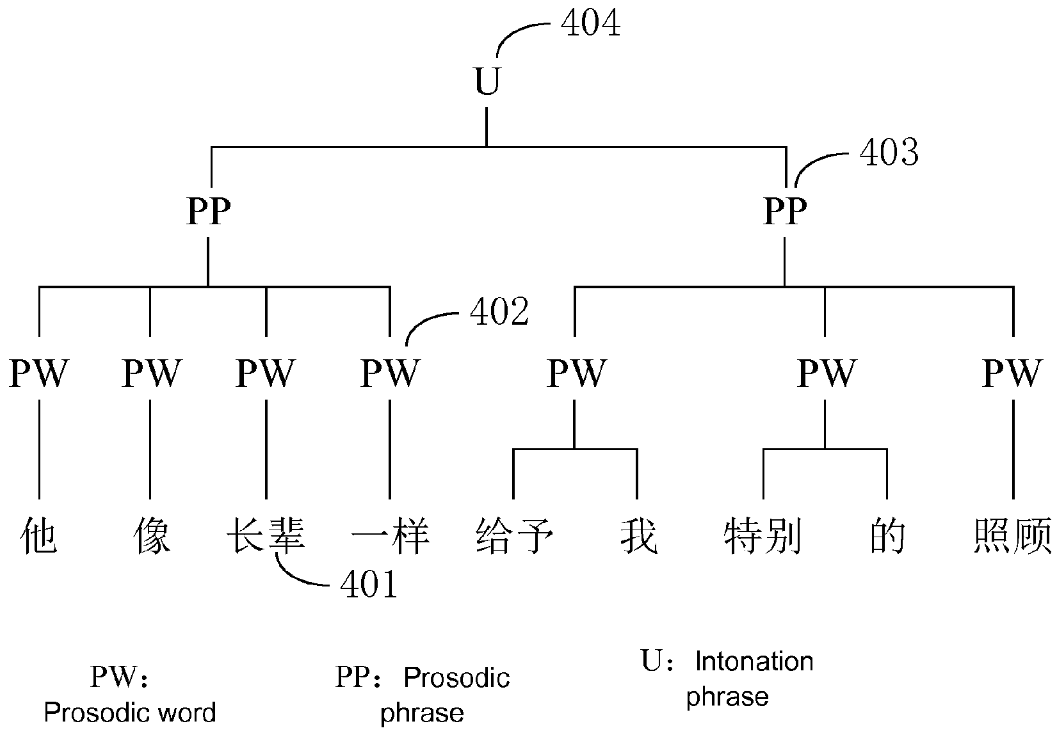
FIG. 4 is a schematic diagram of a prosodic structure of a Chinese sentence applicable to the embodiments of the present invention.

The prosodic processing of the input text cannot be performed without the prosodic structure prediction on the input text. In general, the prosodic structure of Chinese is considered to comprise three hierarchies: prosodic word, prosodic phrase and intonation phrase. FIG. 4 is a schematic diagram of a prosodic structure of a Chinese sentence. The Chinese sentence is composed by joining many grammatical words 401; one or more grammatical words 401 collectively compose a prosodic word 402; one or more prosodic words 402 collectively compose a prosodic phrase 403; and then one or more prosodic phrases 403 collectively compose an intonation phrase 404.

The basic characteristics of the prosodic word 402 are: (1) being composed of one foot; (2) being generally a grammatical word or word group of less than three syllables; (3) the span being one to three syllables, most being two or three syllables, e.g. conjunctions, prepositions, etc.; (4) having a sandhi pattern and a word stress pattern similar to those of a grammatical word, with no rhythm boundary appearing inside; and (5) the prosodic word 402 being able to form a prosodic phrase 403.

The main characteristics of the prosodic phrase 403 are: (1) being formed by one or a few prosodic words 402; (2) the span being seven to nine syllables; (3) rhythm boundaries in terms of prosody potentially appearing between various internal prosodic words 402, with the main expression being the extension of the last syllable of the prosodic word and the resetting of the pitch between prosodic words; (4) the tendency of the tone gradation of the prosodic phrase 403 basically trending down; and (5) having a relatively stable phrase stress configuration pattern, namely, a conventional stress pattern related to the syntactic structure.

The main characteristics of the intonation phrase 404 are: (1) possibly having multiple feet; (2) more than one prosodic phrase intonation pattern and prosodic phrase stress pattern possibly being contained inside, and thus relevant rhythm boundaries appearing, with the main expression being the extension of the last syllable of the prosodic phrase and the resetting of the pitch between prosodic phrases; and (3) having an intonation pattern dependent on different tones or sentence patterns, that is, having a specific tone gradation tendency, for example, a declarative sentence trends down, a general question trends up, and the pitch level of an exclamatory sentence generally rises.

The recognition of these three hierarchies of the input text, that is, the prosodic structure prediction on the input text, determines a pause feature of the synthesized speech in the middle of a sentence. In general, three pause levels exist in one-to-one correspondence with prosodic hierarchies in the input text of the system, and the higher the prosodic hierarchy is, the more obvious the pause feature bounded thereby is; and the lower the prosodic hierarchy is, the more obscure the pause feature bounded thereby is. Moreover, the pause feature of the synthesized speech has a great influence on the naturalness thereof. Therefore, the prosodic structure prediction on the input text affects the naturalness of the final synthesized speech to a great extent.

The result of performing prosodic structure prediction on the input text is a prosodic boundary partitioning solution. The speech synthesis is performed according to different prosodic boundary partitioning solutions, and thus parameters such as a pause point and a pause time length of the synthesized speech are different. The prosodic boundary partitioning solution comprises a prosodic word boundary, a prosodic phrase boundary and an intonation phrase boundary which are obtained via prediction. That is to say, the prosodic boundary partitioning solution comprises the partitioning of the boundaries for prosodic words, prosodic phrases and intonation phrases.

It should be understood that with the prosodic structure prediction being performed on the same input text, different prosodic boundary partitioning solutions for the input text may be output. Preferably, different prosodic boundary partitioning solutions for the input text may be obtained by outputting multiple superior prosodic boundary partitioning solutions for the input text.

In the process of performing prosodic structure prediction on the input text, it is generally considered that the intonation phrases are easily recognized, because the intonation phrases are basically separated by punctuation marks; meanwhile, the prediction of the prosodic words may depend on a method of summarizing the rules, and this has basically met the use requirements. In comparison, the prediction of the prosodic phrases becomes a difficulty in the prosodic structure prediction. Therefore, the prosodic structure prediction of the input text is mainly to solve the prediction of the prosodic phrase boundary.

The prosodic structure prediction of the input text is performed based on a prosodic structure prediction model. The prosodic structure prediction model is generated by carrying out statistical learning on annotated data in a text corpus and a speech corpus. Preferably, the statistical learning may be performed on the annotated data in the text corpus and the speech corpus utilizing a decision tree algorithm, a conditional random field algorithm, a maximum entropy model algorithm and a hidden Markov model algorithm so as to generate the prosodic structure prediction model.

The text corpus and the speech corpus are two basic corpora used for training the prosodic structure prediction model, wherein a storage object of the text corpus is text data, and a storage object of the speech corpus is speech data. The text corpus and the speech corpus not only store basic corpora but also accordingly store annotated data of these corpora. The annotated data of the corpora at least comprises annotated data on the prosodic hierarchy structure of the corpora.

The structure of the annotated data on the corpora is illustrated taking a text corpus as an example. FIG. 5 is a schematic diagram of prosodic annotated data in a text corpus provided by the first embodiment of the present invention. With reference to FIG. 5, the text corpus not only stores a corpus 501 but also stores annotated data 502 on the prosodic structure of the corpus. The corpus 501 is stored in sentences, and prosodic words, prosodic phrases and intonation phrases are divided inside these sentences. The annotated data 502 of the corpus is an annotation of which prosodic boundary the end of the prosodic word in the corpus is. In the annotated data on the prosodic structure of the corpus, B0 denotes that the end of the prosodic word is a prosodic word boundary; B1 denotes that the end of the prosodic word is a prosodic phrase boundary; and B2 denotes that the end of the prosodic word is an intonation phrase boundary.

In this embodiment, after the input text is received, the prosodic structure prediction model is utilized to perform prosodic structure prediction on the input text to acquire at least two prosodic boundary partitioning solutions for the input text.

S320, a prosodic boundary partitioning solution is determined according to structure probability information about a prosodic unit in a speech corpus in the at least two alternative prosodic boundary partitioning solutions.

In speech synthesis, the input text may be regarded as a set of different prosodic units. That is to say, the input text comprises different prosodic units. The prosodic unit is a syllable corresponding to each Chinese character in the input text. For example, an input text of "我爱北 京天安门 (I love Tian An Men, Beijing)" comprises a prosodic unit "门"; and an input text of "好好学习，天天向上 (Study hard and make progress everyday)" comprises a prosodic unit "习".

After different prosodic boundary partitioning solutions are provided with regard to the input text, since prosodic boundaries provided by different prosodic boundary partitioning solutions are different, prosodic units located at the same locations in different prosodic boundary partitioning solutions are different.

As an example, as regards input text "短短两周时间上涨的价格超过了过去 五年的 总和", if only prosodic phrase boundary partitioning is given, there are the following two prosodic boundary partitioning solutions:

短短两周时间 上涨的价格 超过了过去五年的 总和.

短短两周时间 上涨的价格超过了 过去五年的总和.

In the above-mentioned two prosodic boundary partitioning solutions, the symbol "$" denotes a prosodic phrase boundary in the prosodic boundary partitioning solutions. It can be seen that in the first prosodic boundary partitioning solution, a prosodic unit "格" is at the end of the second prosodic phrase of the prosodic boundary partitioning solution, while in the second prosodic boundary partitioning solution, a prosodic unit "了" is at the end of the second prosodic phrase in the prosodic boundary partitioning solution.

In the present embodiment, structure probability information about different prosodic units in the speech corpus is compared, and a final prosodic boundary partitioning solution is determined from at least two alternative prosodic boundary partitioning solutions according to the comparison result. The structure probability information about the prosodic unit comprises: a probability that the prosodic unit appears at the head or tail of a prosodic word, a prosodic phrase or an intonation phrase.

In the examples of the above two prosodic boundary partitioning solutions, the prosodic unit "格" and the prosodic unit "了" are respectively at the ends of the first prosodic boundary partitioning solution and the second prosodic boundary partitioning solution. If the probability that the prosodic unit "格" is at the end of the prosodic phrase is greater than the probability that the prosodic unit "了" is at the end of the prosodic phrase in the speech corpus, the first prosodic boundary partitioning solution is selected as the final prosodic boundary partitioning solution; and if the probability that the prosodic unit "了" is at the end of the prosodic phrase is greater than the probability that the prosodic unit "格" is at the end of the prosodic phrase in the speech corpus, the second prosodic boundary partitioning solution is selected as the final prosodic boundary partitioning solution.

S330, speech synthesis is carried out according to the determined prosodic boundary partitioning solution.

After the prosodic boundary partitioning solution for the input text is determined, speech synthesis is carried out according to the determined prosodic boundary partitioning solution. The speech synthesis comprises speech synthesis of waveform concatenation type and speech synthesis of parameter synthesis type.

In the above-mentioned solutions, it is preferred that the above-mentioned solution may be first adopted to determine a prosodic word partitioning solution, and if necessary, prosodic phrase partitioning may be performed on the basis of the prosodic word partitioning to obtain multiple alternative prosodic phrase partitioning solutions, and a similar method is adopted to obtain a preferred alternative solution which serves as the final prosodic boundary partitioning solution.

Figure 6:
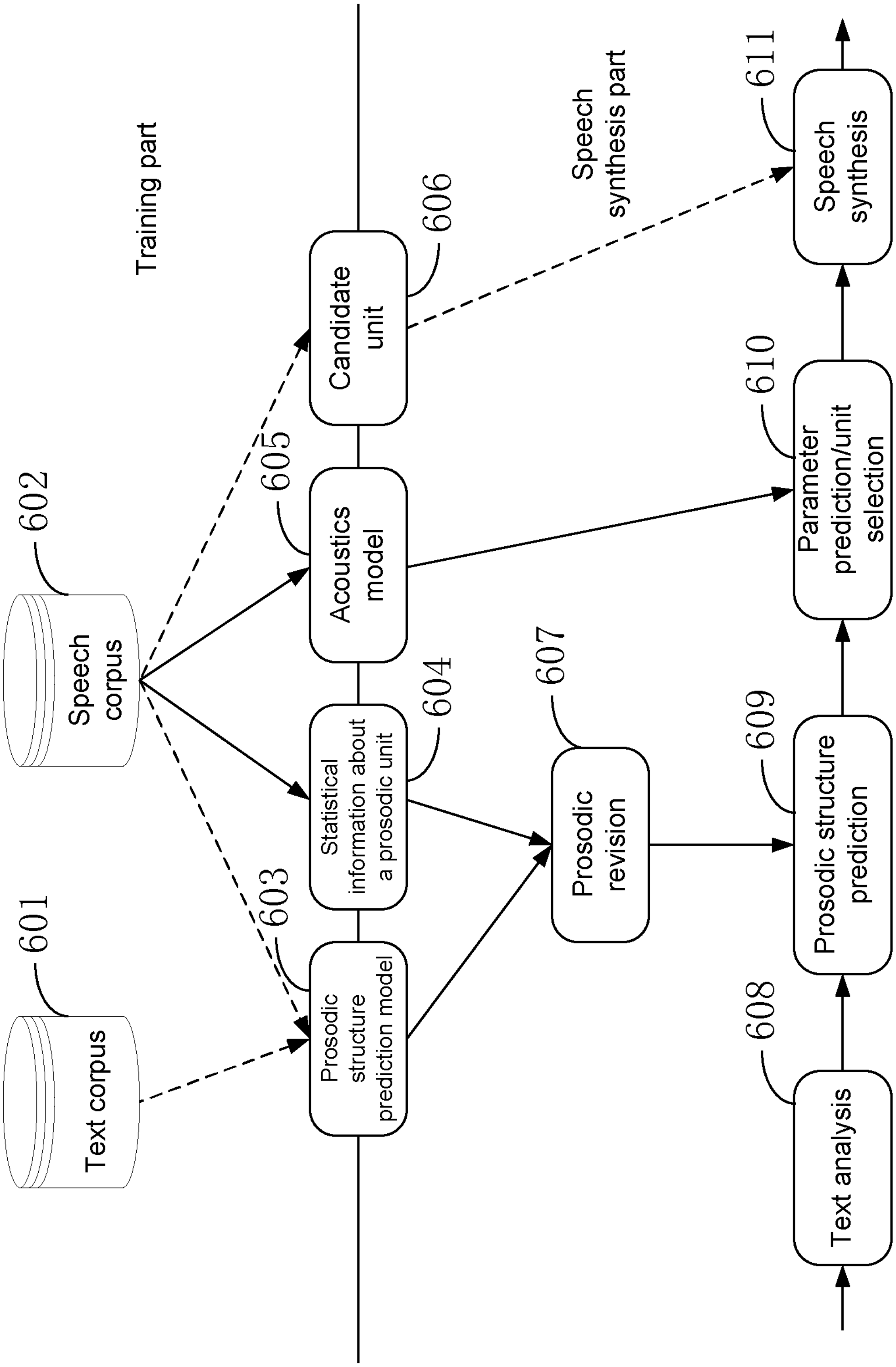
FIG. 6 is a diagram illustrating a signal flow of a speech synthesis system which operates a method for speech synthesis based on a large corpus provided by the first embodiment of the present invention.

FIG. 6 is a diagram illustrating a signal flow of a speech synthesis system which operates a method for speech synthesis based on a large corpus provided by the first embodiment of the present invention. With reference to FIG. 6, the speech synthesis on the input text by a speech synthesis system which operates a method for speech synthesis based on a large corpus further comprises prosodic revision 607 performed on the prosodic structure according to the structure probability information about the prosodic unit in the speech corpus, in addition to text analysis 608 on the input text, prosodic structure prediction 609 on the input text according to the prosodic structure prediction model, parameter prediction/unit selection 610 on the input text, and final speech synthesis 611 included in a speech synthesis system in the prior art. The speech synthesis on the input text is carried out according to the revised prosodic structure, and the obtained synthesized speech has a higher naturalness.

The present embodiment provides at least two alternative prosodic boundary partitioning solutions by performing prosodic structure prediction on the input text, then determines a prosodic boundary partitioning solution according to structure probability information about a prosodic unit in the at least two alternative prosodic boundary partitioning solutions, and finally carries out speech synthesis according to the determined prosodic boundary partitioning solution, so that the prosodic structure prediction performed on the input text makes reference to the structure probability information about the prosodic unit in the corpus, and the naturalness and flexibility of speech synthesis are improved.

Figure 7:
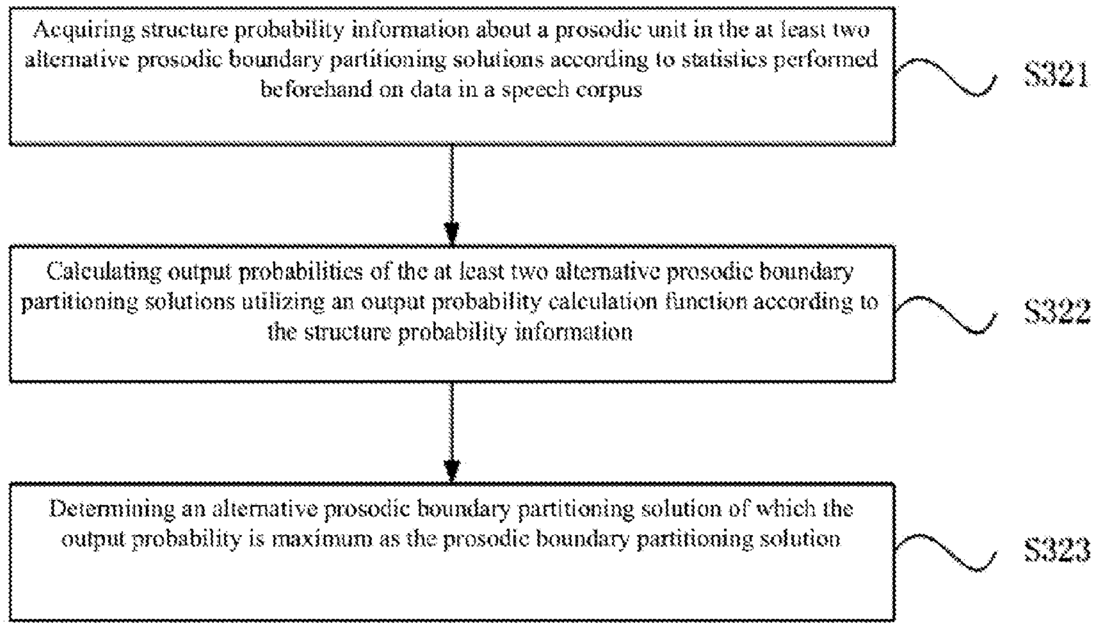
FIG. 7 is a flowchart of boundary partitioning in a method for speech synthesis based on a large corpus provided by a second embodiment of the present invention.

FIG. 7 illustrates a second embodiment of the present invention.

FIG. 7 is a flowchart of boundary partitioning in a method for speech synthesis based on a large corpus provided by a second embodiment of the present invention. The method for speech synthesis based on a large corpus is based on the first embodiment of the present invention, furthermore, determining a prosodic boundary partitioning solution according to structure probability information about a prosodic unit in a speech corpus in the at least two alternative prosodic boundary partitioning solutions comprises:

S321, structure probability information about a prosodic unit in the at least two alternative prosodic boundary partitioning solutions is acquired according to statistics taken beforehand on data in the speech corpus.

When the prosodic boundary partitioning solution for the input text is determined according to location statistical information about the prosodic unit, firstly, the structure probability information about the prosodic unit in the at least two alternative prosodic boundary partitioning solutions is acquired according to statistics taken beforehand on data in the speech corpus. The structure probability information about the prosodic unit comprises: a probability that the prosodic unit appears at the head or tail of a prosodic word, a prosodic phrase or an intonation phrase.

The prosodic unit should select a prosodic unit located at a prosodic boundary in the alternative prosodic boundary partitioning solution. If the structure probability information about the prosodic unit refers to the probability that the prosodic unit appears at the head of a prosodic word, a prosodic phrase or an intonation phrase, a prosodic unit behind the prosodic boundary needs to be selected; and if the structure probability information about the prosodic unit refers to the probability that the prosodic unit appears at the tail of a prosodic word, a prosodic phrase or an intonation phrase, a prosodic unit ahead of the prosodic boundary needs to be selected.

Preferably, the structure probability information about the prosodic unit may be expressed by means of the formula as follows:

$$Wi=\beta\times\log(m+n0)-\gamma.$$

Where m denotes the number of prosodic units which are located at a target location in a target prosodic hierarchy in the speech corpus, wherein the target prosodic hierarchy comprises a prosodic word, prosodic phrase and intonation phrase, and the target location may be the head or tail of a prosodic word, a prosodic phrase or an intonation phrase; n0 is a number adjustment parameter and it may be any integer greater than zero; $\beta$ is a probability scaling coefficient; and $\gamma$ is a probability offset coefficient. In the above formula, the parameters n0, $\beta$ and $\gamma$ are parameters which are valued based on experience, and the result Wi obtained through calculation via the above formula denotes the structure probability information about the prosodic unit in the speech corpus.

S322, output probabilities of the at least two alternative prosodic boundary partitioning solutions are calculated utilizing an output probability calculation function according to the structure probability information.

Preferably, weighted average is performed on target prosodic hierarchy probabilities and structure probabilities of the at least two alternative prosodic boundary partitioning solutions in accordance with a predetermined weight parameter to determine output probabilities of the at least two alternative prosodic boundary partitioning solutions.

As an example, the output probability calculation function is as shown in the formula as follows:

$$f(Wp,Wi)=\alpha\times Wp+(1-\alpha)Wi,$$

where $\alpha$ is a weight coefficient and is a parameter which is valued based on experience, and the value thereof is between zero and one; Wp is the prosodic hierarchy probability of the prosodic unit; and Wi is the structure probability of the prosodic unit. The prosodic hierarchy probability of the prosodic unit, that is, Wp, is a probability value corresponding to the prosodic unit which is output by the prosodic structure prediction model when prosodic structure prediction is performed on the input text utilizing the prosodic structure prediction model, and it denotes the probability of the input text that a prosodic boundary of a corresponding hierarchy appears at the prosodic unit. The corresponding hierarchy may be a prosodic word hierarchy, a prosodic phrase hierarchy or an intonation phrase hierarchy.

The structure probability of the prosodic unit refers to the probability that the prosodic unit appears at a specific location in the corpus of the speech corpus. The structure probability may be obtained by taking statistics on locations where the prosodic unit appears in the speech corpus.

Preferably, the structure probability of the prosodic unit refers to the probability that the prosodic unit appears at the head or tail of a prosodic word, a prosodic phrase or an intonation phrase in the speech corpus.

A calculation result of the output probability calculation function is an output probability of the alternative prosodic boundary partitioning solution.

S323, an alternative prosodic boundary partitioning solution of which the output probability is the maximum is determined as the prosodic boundary partitioning solution.

It may be considered that the alternative prosodic boundary partitioning solution of which the output probability is the maximum is the most suitable prosodic boundary partitioning solution based on the structure probability information about the prosodic unit in the speech corpus, and therefore, the alternative prosodic boundary partitioning solution of which the output probability is the maximum is taken as the final prosodic boundary partitioning solution.

By acquiring structure probability information about a prosodic unit in the at least two alternative prosodic boundary partitioning solutions, then calculating output probabilities of the at least two alternative prosodic boundary partitioning solutions utilizing an output probability calculation function according to the structure probability information, and finally determining the alternative prosodic boundary partitioning solution of which the output probability is the maximum as the final prosodic boundary partitioning solution, this embodiment completes the determination of the prosodic boundary partitioning solution according to location statistical information about the prosodic unit, and improves the naturalness and flexibility of speech synthesis.

Figure 8:
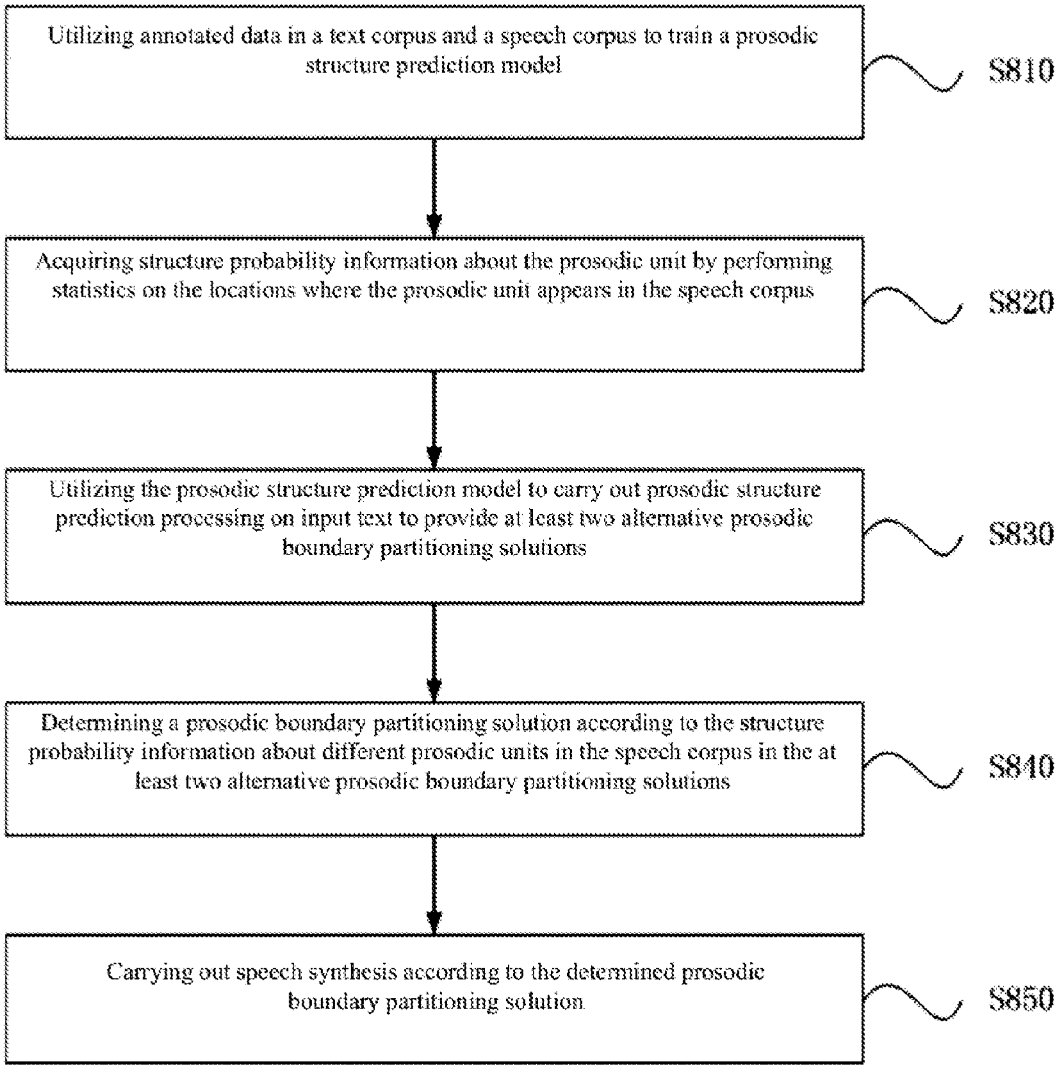
FIG. 8 is a flowchart of a method for speech synthesis based on a large corpus provided by a preferred embodiment of the present invention.

FIG. 8 illustrates a preferred embodiment of the present invention.

FIG. 8 is a flowchart of a method for speech synthesis based on a large corpus provided by a preferred embodiment of the present invention. With reference to FIG. 8, the method for speech synthesis based on a large corpus comprises:

S810, annotated data in a text corpus and a speech corpus is utilized to train a prosodic structure prediction model.

A speech synthesis system is a system which converts an input text sequence into a synthesized speech waveform. It converts a text file via certain software and hardware, and then outputs speech via a computer or other speech systems, and enables the synthesized speech to have relatively high articulation and naturalness like a human voice as far as possible.

The speech synthesis on the input text is performed based on corpora data in two corpuses, a text corpus and a speech corpus. The text corpus and the speech corpus both store mass corpora data. The format of the corpus data in the text corpus is a text format, and it is a basic reference for performing text analysis on the input text. The format of the corpus data in the speech corpus is an audio format, and it is basic data for performing speech synthesis after completing the analysis of the input text.

Between two steps of input text analysis and speech synthesis and output, prediction must be performed on the prosodic structure of the input text. The prosodic structure prediction on the input text determines acoustics parameters such as pause points and pause time lengths of the output speech. The prosodic structure prediction on the input text must be performed based on a trained prosodic structure prediction model.

The training for the prosodic structure prediction model is performed based on annotated data in the text corpus and the speech corpus. The annotated data annotates the prosodic structure of the corpora. In the process of training the prosodic structure prediction model, by means of statistical learning on the annotated data in the text corpus and the speech corpus, the prosodic structure prediction model perfects the structure thereof, and thus can predict the prosodic structure of the input text with regard to the input text.

In this embodiment, the statistical learning on the annotated data in the text corpus and the speech corpus comprises: statistical learning carried out according to a decision tree algorithm, a conditional random field algorithm, a maximum entropy model algorithm and a hidden Markov model algorithm.

S820, structure probability information about the prosodic unit is acquired by taking statistics on the locations where the prosodic unit appears in the speech corpus.

The speech corpus stores mass speech corpus segments. The speech corpus segment is composed of different prosodic units. For example, the speech corpus stores a speech corpus segment of "到达目的地 (arriving at a destination)", then the speech corpus segment comprises five prosodic units, namely "到", "达", "目", "的" and "地".

The speech corpus segment may be a prosodic word, a prosodic phrase or an intonation phrase. In this embodiment, the speech corpus segment is a prosodic phrase.

The structure probability information refers to information about the probability that the prosodic unit appears at a set location in a speech corpus segment in the speech corpus. Preferably, the structure probability information refers to information about the probability that the prosodic unit appears at the head or tail of the speech corpus segment in the speech corpus.

The structure probability information may be acquired by taking statistics on the locations where the prosodic unit appears in the speech corpus. Preferably, the structure probability information may be acquired via the probability that the prosodic unit appears at the head or tail of a speech corpus segment in the speech corpus.

S830, the prosodic structure prediction model is utilized to carry out prosodic structure prediction processing on input text to provide at least two alternative prosodic boundary partitioning solutions.

After receiving the input text, the trained prosodic structure prediction model is utilized to carry out prosodic structure prediction processing on the input text. The result of carrying out the prosodic structure prediction processing on the input text is at least two alternative prosodic boundary partitioning solutions regarding the input text. Preferably, different prosodic boundary partitioning solutions for the input text may be obtained by outputting at least two superior alternative prosodic boundary partitioning solutions for the input text.

The prosodic boundary partitioning solution is used for defining prosodic boundaries of the input text. Preferably, according to different prosodic hierarchies of the input text, the prosodic boundaries of the input text defined by the prosodic boundary partitioning solution comprise a prosodic word boundary, a prosodic phrase boundary and an intonation phrase boundary.

Since the prediction of prosodic phrases becomes a difficulty in prosodic structure prediction, the prosodic structure boundary partitioning is described merely taking the prosodic phrase boundary partitioning as an example in this embodiment. Those skilled in the art should understand that the process of performing boundary partitioning on prosodic words and intonation phrases is similar to the process of performing boundary partitioning on prosodic phrases.

As an example, the prosodic phrase boundary partitioning on the input text "短短两 周时间上涨的价格 超过了过去五年的总和" is taken as an example to describe the process of providing at least two alternative prosodic boundary partitioning solutions. With regard to the above-mentioned input text, there are two prosodic phrase boundary partitioning solutions as follows:

短短两周时间 上涨的价格 超过了过去五年的 总和.

短短两周时间 上涨的价格超过了 过去五年的总和.

The symbol "$" denotes a prosodic phrase boundary in the prosodic boundary partitioning solution.

S840, a prosodic boundary partitioning solution is determined according to the structure probability information about the prosodic unit in the speech corpus in the at least two alternative prosodic boundary partitioning solutions.

The prosodic word, prosodic phrase or intonation phrase are all composed of prosodic units. In the speech corpus, the prosodic unit will appear at the head or tail of a prosodic word, a prosodic phrase or an intonation phrase according to a certain probability. For example, the probability that the prosodic unit "了" appears at the tail of the prosodic phrase is 0.78. This probability is the structure probability information about the prosodic unit in the speech corpus.

The structure probability information about the prosodic unit may be obtained by taking statistics on the locations where the prosodic unit appears in the speech corpus, that is, the probability that the prosodic unit appears at the head or tail of a prosodic word, a prosodic phrase or an intonation phrase. After the structure probability information about the prosodic unit is obtained, output probabilities of the at least two alternative prosodic boundary partitioning solutions may be respectively calculated based on the structure probability information about the prosodic unit, and then the final prosodic boundary partitioning solution may be determined from the at least two alternative prosodic boundary partitioning solutions based on the output probabilities.

Preferably, the output probabilities of the at least two alternative prosodic boundary partitioning solutions may be calculated according to the formula as follows:

$$f(Wp,Wi)=\alpha\times Wp+(1-\alpha)Wi,$$

where α is a weight coefficient and is a parameter which is valued based on experience, and the value thereof is between zero and one and will not change for different alternative prosodic boundary partitioning solutions once selected; Wp is the prosodic hierarchy probability of the prosodic unit; and Wi is the structure probability of the prosodic unit.

Taking the above-mentioned two prosodic boundary partitioning solutions on the input text "短短两周时间上涨的价格超过了过去 五年的总和" as an example, if the probability that the prosodic unit "了" appears at the end of the prosodic phrase in the speech corpus is greater than the probability that the prosodic unit "格" appears at the end of the prosodic phrase, the output probability of the second prosodic boundary partitioning solution obtained through calculation based on the structure probability information is greater than the output probability of the first prosodic boundary partitioning solution, and therefore the second prosodic boundary partitioning solution is selected as the final prosodic boundary partitioning solution.

S850, speech synthesis is carried out according to the determined prosodic boundary partitioning solution.

After the prosodic boundary partitioning solution for the input text is determined, speech synthesis is carried out according to the determined prosodic boundary partitioning solution. The speech synthesis may be speech synthesis of waveform concatenation type and may also be speech synthesis of parameter synthesis type.

It should be noted that the above-mentioned method steps may possibly not be executed by a computer. Actually, it is possible that the training on the prosodic structure prediction model is completed on a computer, and then the trained prosodic structure prediction model is transplanted to another computer to complete speech synthesis on the input text.

By means of training a prosodic structure prediction model, taking statistics on the location statistical information about a prosodic unit, performing prosodic structure prediction on input text so as to provide at least two alternative prosodic boundary partitioning solutions, determining the final prosodic boundary partitioning solution from the at least two alternative prosodic boundary partitioning solutions according to the location statistical information about the prosodic unit, and finally carrying out speech synthesis according to the determined prosodic boundary partitioning solution, this embodiment enables the location statistical information about the prosodic unit to perform prosodic structure prediction on the input text so as to improve the naturalness and flexibility of speech synthesis.

Figure 9:
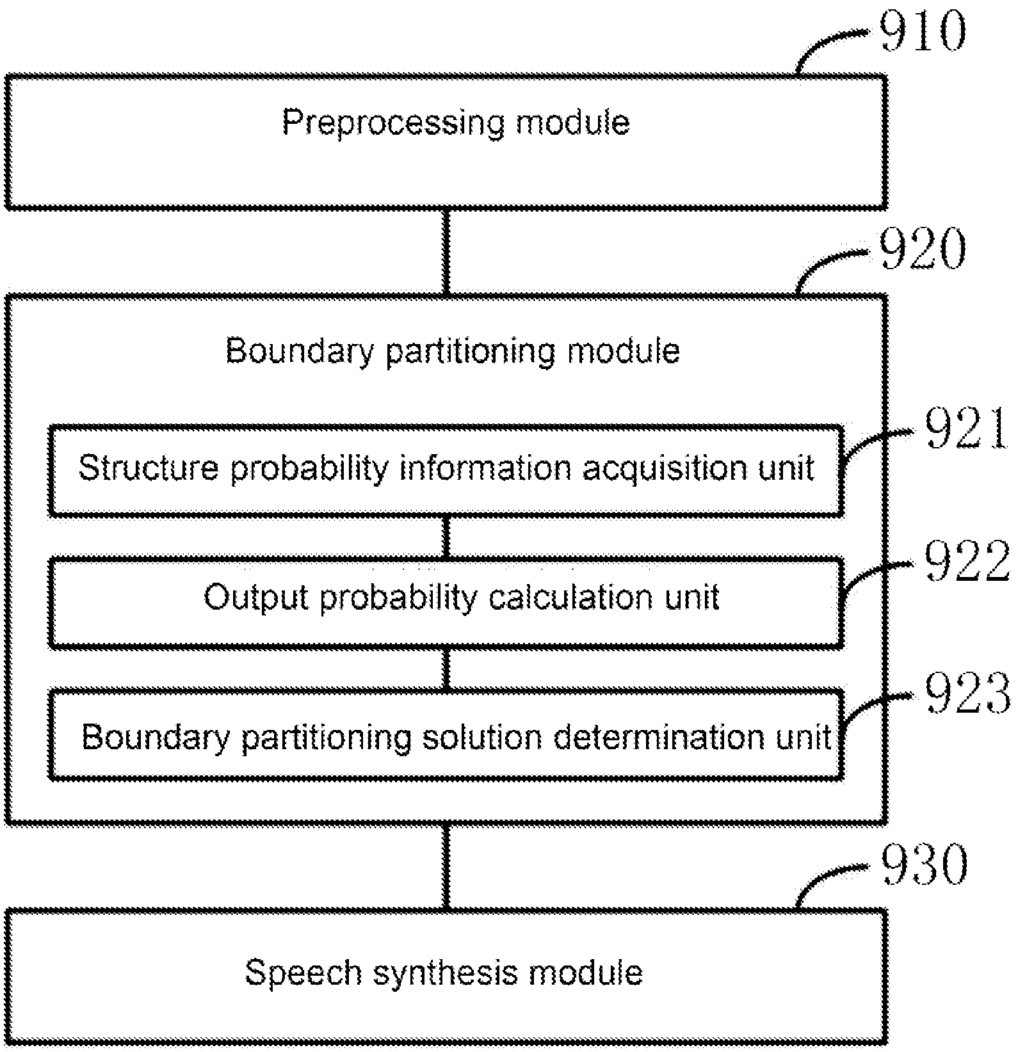
FIG. 9 is a structural diagram of an apparatus for speech synthesis based on a large corpus provided by a third embodiment of the present invention.

FIG. 9 illustrates a third embodiment of the present invention.

FIG. 9 is a structural diagram of an apparatus for speech synthesis based on a large corpus provided by a third embodiment of the present invention. With reference to FIG. 9, the apparatus for speech synthesis based on a large corpus comprises: a prediction processing module 910, a boundary partitioning module 920 and a speech synthesis module 930.

The prediction processing module 910 is used for utilizing a prosodic structure prediction model to carry out prosodic structure prediction processing on input text to provide at least two alternative prosodic boundary partitioning solutions.

The boundary partitioning module 920 is used for determining a prosodic boundary partitioning solution according to structure probability information about a prosodic unit in a speech corpus in the at least two alternative prosodic boundary partitioning solutions.

The speech synthesis module 930 is used for carrying out speech synthesis according to the determined prosodic boundary partitioning solution.

Preferably, the prosodic structure prediction model is generated by carrying out statistical learning beforehand on annotated data in a text corpus and a speech corpus.

Preferably, the statistical learning carried out beforehand on the annotated data in the text corpus and the speech corpus comprises: statistical learning carried out according to a decision tree algorithm, a conditional random field algorithm, a maximum entropy model algorithm and a hidden Markov model algorithm.

Preferably, the boundary partitioning module comprises: a structure probability information acquisition unit 921, an output probability calculation unit 922 and a boundary partitioning solution determination unit 923.

The structure probability information acquisition unit 921 is used for acquiring structure probability information about a prosodic unit in the at least two alternative prosodic boundary partitioning solutions according to statistics taken beforehand on data in the speech corpus.

The output probability calculation unit 922 is used for calculating output probabilities of the at least two alternative prosodic boundary partitioning solutions utilizing an output probability calculation function according to the structure probability information.

The boundary partitioning solution determination unit 923 is used for determining an alternative prosodic boundary partitioning solution of which the output probability is the maximum as the prosodic boundary partitioning solution.

Preferably, the prosodic boundaries partitioned by the at least two alternative prosodic boundary partitioning solutions comprise: a prosodic word boundary, a prosodic phrase boundary or an intonation phrase boundary.

Preferably, the structure probability information about the prosodic unit comprises: a probability that the prosodic unit appears at the head or tail of a prosodic word, a prosodic phrase or an intonation phrase.

Preferably, the output probability calculation unit 922 is specifically used for: performing weighted average on target prosodic hierarchy probabilities and structure probabilities of the at least two alternative prosodic boundary partitioning solutions in accordance with a predetermined weight parameter, and determining output probabilities of the at least two alternative prosodic boundary partitioning solutions.

The sequence numbers of the preceding embodiments of the present invention are merely for descriptive purpose but do not indicate a preference in the embodiments.

Those of ordinary skill in the art shall understand that the various modules or various steps above of the present invention can be implemented by using a general purpose calculation apparatus, can be integrated in a single calculation apparatus or distributed on a network which consists of a plurality of calculation apparatuses, and optionally, they can be implemented by using executable program codes of a computer apparatus, so that consequently they can be stored in a storage apparatus and executed by the calculation apparatus, or they are made into various integrated circuit modules respectively, or a plurality of modules or steps thereof are made into a single integrated circuit module. In this way, the present invention is not limited to any particular combination of hardware and software.

Various embodiments in the present description are described in a progressive manner, with each embodiment emphasizing its differences from other embodiments, and the same or similar parts between the various embodiments may be cross-referenced.

The description above is only preferred embodiments of the present invention and is not intended to limit the present invention, and for those skilled in the art, the present invention can have a variety of changes and variations. Any modification, equivalent replacement, or improvement made within the spirit and principle of the present invention shall all fall within the scope of protection of the present invention.

What is claimed is:

1. A method for speech synthesis based on a large Chinese corpus, comprising:

utilizing a prosodic structure prediction model to carry out prosodic structure prediction processing on input text to provide at least two alternative prosodic boundary partitioning solutions, prosodic units located at a same location in the at least two alternative prosodic boundary partitioning solutions being different;

acquiring structure probability information about a prosodic unit in the at least two alternative prosodic boundary partitioning solutions according to statistics taken beforehand on data in a Chinese speech corpus, wherein the structure probability information includes a structure probability that the prosodic unit appears at a head or a tail of a prosodic word, a prosodic phrase or an intonation phrase in the Chinese speech corpus;

calculating output probabilities of the at least two alternative prosodic boundary partitioning solutions utilizing an output probability calculation function according to the structure probability information; and determining, in the at least two alternative prosodic boundary partitioning solutions, an alternative prosodic boundary partitioning solution of which the output probability is the maximum as a prosodic boundary partitioning solution; and carrying out speech synthesis by acoustic processing to convert the input text into a speech having a pause point and a pause time length according to the determined alternative prosodic boundary partitioning solution.

2. The method of claim 1, further comprising performing statistical learning beforehand on annotated data in a Chinese text corpus and the Chinese speech corpus and generating the prosodic structure prediction model based upon said performing.

3. The method of claim 2, wherein said performing comprises performing the statistical learning according to at least one of a decision tree process, a conditional random field process, a maximum entropy model process and a hidden Markov model process.

4. The method of claim 1, wherein prosodic boundaries partitioned by the at least two alternative prosodic boundary partitioning solutions comprise a prosodic word boundary, a prosodic phrase boundary and an intonation phrase boundary, or a combination thereof.

5. The method of claim 1, wherein the structure probability information about the prosodic unit comprises at least one of a probability that the prosodic unit appears at a head of a prosodic word, a tail of the prosodic word, a head of a prosodic phrase, a tail of the prosodic phrase, a head of a intonation phrase and a tail of the intonation phrase.

6. The method of claim 1, wherein said calculating comprises performing weighted average on target prosodic hierarchy probabilities and structure probabilities of the at least two alternative prosodic boundary partitioning solutions in accordance with a predetermined weight parameter to determine output probabilities of the at least two alternative prosodic boundary partitioning solutions, wherein the target prosodic hierarchy probabilities include a prosodic hierarchy probability of the input text that a prosodic boundary of a corresponding prosodic hierarchy appears at the prosodic unit when prosodic structure prediction is performed on the input text utilizing the prosodic structure prediction model.

7. The method of claim 6, wherein said calculating comprises calculating the output probabilities based on $f(Wp,Wi)=\alpha\times Wp+(1-\alpha)Wi$, wherein $f(Wp,Wi)$ is the output probability, a is a weight coefficient between zero and one, Wp is the prosodic hierarchy probability of the prosodic unit, and Wi is the structure probability of the prosodic unit.

8. The method of claim 1, wherein said calculating comprises calculating the structure probability based on $Wi=\beta\times\log(m+n0)-\gamma$, wherein m is a number of prosodic units appearing at a head or a tail of a prosodic word, a prosodic phrase or an intonation phrase in the Chinese speech corpus, n0 is a number adjustment parameter greater than zero, $\beta$ is a probability scaling coefficient, $\gamma$ is a probability offset coefficient, and Wi is the structure probability.

9. The method of claim 1, wherein the prosodic units at the same location in the at least two alternative prosodic boundary partitioning solutions includes the prosodic units at a same target location of a same target prosodic hierarchy at a same sequential position in each of the at least two alternative prosodic boundary partitioning solutions, wherein the target prosodic hierarchy includes a prosodic word, a prosodic phrase, or an intonation phrase, and the target location include a head or a tail.

10. An apparatus for speech synthesis based on a large Chinese corpus, comprising:

a processor; and a computer storage medium having program stored thereon for instructing said processor, the program including instruction for:

utilizing a prosodic structure prediction model to carry out prosodic structure prediction processing on input text to provide at least two alternative prosodic boundary partitioning solutions, prosodic units located at a same location in the at least two alternative prosodic boundary partitioning solutions being different;

acquiring structure probability information about a prosodic unit in the at least two alternative prosodic boundary partitioning solutions according to statistics taken beforehand on data in the Chinese speech corpus, wherein the structure probability information includes a structure probability that the prosodic unit appears at a head or a tail of a prosodic word, a prosodic phrase or an intonation phrase in the Chinese speech corpus;

calculating output probabilities of the at least two alternative prosodic boundary partitioning solutions utilizing an output probability calculation function according to the structure probability information; and determining, in the at least two alternative prosodic boundary partitioning solutions, an alternative prosodic boundary partitioning solution of which the output probability is the maximum as a prosodic boundary partitioning solution; and carrying out speech synthesis by acoustic processing to convert the input text into a speech having a pause point and a pause time length according to the determined alternative prosodic boundary partitioning solution.

11. The apparatus of claim 10, wherein the prosodic structure prediction model is generated by performing statistical learning beforehand on annotated data in a Chinese text corpus and the Chinese speech corpus.

12. The apparatus of claim 11, wherein the statistical learning is performed according to at least one of a decision tree process, a conditional random field process, a maximum entropy model process and a hidden Markov model process.

13. The apparatus of claim 10, wherein prosodic boundaries partitioned by the at least two alternative prosodic boundary partitioning solutions comprise a prosodic word boundary, a prosodic phrase boundary and an intonation phrase boundary, or a combination thereof.

14. The apparatus of claim 10, wherein the structure probability information about the prosodic unit comprises at least one of a probability that the prosodic unit appears at a head of a prosodic word, a tail of the prosodic word, a head of a prosodic phrase, a tail of the prosodic phrase, a head of a intonation phrase and a tail of the intonation phrase.

15. The apparatus of claim 10, wherein the program includes instruction for performing weighted average on target prosodic hierarchy probabilities and structure probabilities of the at least two alternative prosodic boundary partitioning solutions in accordance with a predetermined weight parameter to determine output probabilities of the at least two alternative prosodic boundary partitioning solutions, wherein the target prosodic hierarchy probabilities include a prosodic hierarchy probability of the input text that a prosodic boundary of a corresponding prosodic hierarchy appears at the prosodic unit when prosodic structure prediction is performed on the input text utilizing the prosodic structure prediction model.

16. The apparatus of claim 15, wherein the program includes instruction for calculating the output probabilities based on $f(Wp,Wi)=\alpha\times Wp+(1-\alpha)Wi$, wherein $f(Wp,Wi)$ is the output probability, a is a weight coefficient between zero and one, Wp is the prosodic hierarchy probability of the prosodic unit, and Wi is the structure probability of the prosodic unit.

17. The apparatus of claim 10, wherein the program includes instruction for calculating the structure probability based on $Wi=\beta\times\log(m+n0)-\gamma$, wherein m is a number of prosodic units appearing at a head or a tail of a prosodic word, a prosodic phrase or an intonation phrase in the Chinese speech corpus, n0 is a number adjustment parameter greater than zero, $\beta$ is a probability scaling coefficient, $\gamma$ is a probability offset coefficient, and Wi is the structure probability.

18. A non-transitory computer readable medium including at least one program for speech synthesis based on a Chinese large corpus when implemented by a processor, comprising:

instruction for utilizing a prosodic structure prediction model to carry out prosodic structure prediction processing on input text to provide at least two alternative prosodic boundary partitioning solutions, prosodic units located at a same location in the at least two alternative prosodic boundary partitioning solutions being different;

instruction for acquiring structure probability information about a prosodic unit in the at least two alternative prosodic boundary partitioning solutions according to statistics taken beforehand on data in a Chinese speech corpus, wherein the structure probability information includes a structure probability that the prosodic unit appears at a head or a tail of a prosodic word, a prosodic phrase or an intonation phrase in the Chinese speech corpus;

instruction for calculating output probabilities of the at least two alternative prosodic boundary partitioning solutions utilizing an output probability calculation function according to the structure probability information; and instruction for determining, in the at least two alternative prosodic boundary partitioning solutions, an alternative prosodic boundary partitioning solution of which the output probability is the maximum as a prosodic boundary partitioning solution; and instruction for carrying out speech synthesis by acoustic processing to convert the input text into a speech having a pause point and a pause time length according to the determined alternative prosodic boundary partitioning solution.

19. The non-transitory computer readable medium of claim 18, further comprising instruction for performing statistical learning beforehand on annotated data in a Chinese text corpus and the Chinese speech corpus and instruction for generating the prosodic structure prediction model based upon said performing.

20. The non-transitory computer readable medium of claim 19, wherein said instruction for performing comprises instruction for performing the statistical learning according to at least one of a decision tree process, a conditional random field process, a maximum entropy model process and a hidden Markov model process.

* * * * *